Aug. 13, 1968   K. F. FRANK   3,397,355

TAP CHANGING TRANSFORMER POWER SUPPLY SYSTEM

Filed March 10, 1966

*INVENTOR.*
KARL F. FRANK
BY *James P. Malone*

United States Patent Office 3,397,355
Patented Aug. 13, 1968

3,397,355
TAP CHANGING TRANSFORMER POWER
SUPPLY SYSTEM
Karl F. Frank, Mineola, N.Y., assignor to Schenck Manufacturing Corporation, Farmingdale, N.Y.
Filed Mar. 10, 1966, Ser. No. 533,524
4 Claims. (Cl. 323—43.5)

ABSTRACT OF THE DISCLOSURE

The present invention provides transformer relay means which are installed for instance in a 120 volt appliance so that it may be plugged into 120 volts or 240 volts without any further internal connections.

Figure 3:
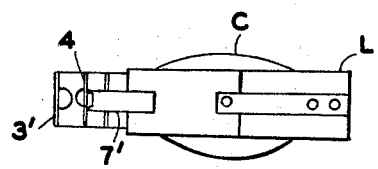

The principle employed is making use of the transformer core magnetic leakage flux pulling an armature of a relay when the higher of the two voltages is connected to the low voltage winding of the transformer. The relay contacts will then transfer the higher operating voltages to the transformer winding tap of its designed operating voltage.

This invention relates to transformer means adapted to connect a 120 voltage appliance to automatically operate the appliance on 120 volts and/or 240 volts service.

Many public utilities provide 120 volts and/or 240 voltage input. If a 120 volt appliance is connected into a 240 volt line, the appliance will be damaged. Typical appliances are household appliances, street lamps and many other electrical appliances. It is understood that the 120 and 240 volt figures are used for illustration only and the invention may be applied to any set of voltages. For instance, in Europe many different supply voltages are in use.

This dual or multiple voltage service requires the appliance manufacturers to manufacture a series of appliances for each voltage or else provide internal connection means to change. Either arrangement provides built in sources of error for electricians, servicemen, and supply men.

The present invention solves this problem and provides transformer relay means which are installed for instance in a 120 volt appliance so that it may be plugged into 120 volts or 240 volts without any further internal connections.

The principle employed is making use of the transformer core magnetic leakage flux pulling an armature of a relay when the higher of the two voltages is connected to the low voltage winding of the transformer. The relay contacts will then transfer the higher operating voltages to the transformer winding tap of its designed operating voltage.

The typical "E-I" transformer core has a notch cut near any one of its four corners. When the lower voltage winding of the transformer is energized by the higher of the two operating voltages the increased leakage flux across this notch pulls the magnetic armature towards the transformer core. The motion of this armature will transfer the spring loaded center leaf contact from the outer to the inner contact of the relay which is adjacent to the transformer core. For low voltage operation the relay must be re-set, either manually or electromechanically.

The invention generally comprises an auto transformer and magnetically operated arm to connect the line input to the center tap for 120 volt input or automatically connect across the full coil for 240 volt input. The solenoid arm is operated by leakage flux in the transformer caused by the application of high voltage. The output of the auto transformer is fixedly connected across one half of the coil.

More particularly, the leakage flux across the notch cut in the outside of the laminations of the transformer core acts upon the spring loaded armature which releases the center contact leaf spring and connects the input across the full coil of the transformer.

Accordingly, a principal object of the invention is to provide new and improved transformer relay means.

Another object of the invention is to provide new and improved automatic transformer means for appliances.

Another object of the invention is to provide new and improved means for plugging in appliances rated at a first lower voltage into sockets supplying a second higher voltage without causing damage to the appliance.

Another object of the invention is to provide new and improved relay transformer means adapted to be connected to an appliance rated at a first lower voltage, said voltage transformer means being adapted to respond to a second higher voltage input to automatically transform from said higher to said lower voltage without damage to said lower voltage appliance.

Another object of the invention is to provide new and improved transformer relay means comprising a transformer having a plurality of laminations of magnetic material, said laminations having apertures to receive a coil, a coil mounted within said apertures, said coil having a center tap and two ends, a first fixed contact mounted on and insulated from said laminations and connected to one end of said coil, a second fixed contact mounted on and insulated from said laminations and connected to the center tap of said coil, said first and second contacts being mounted in parallel relationship but spaced a predetermined amount, a third movable contact mounted on and insulated from said laminations and mounted between said first and second contacts, a pair of input leads, said movable contact being connected to one of said input leads and said second input lead being connected to the other end of said coil, and relay means mounted on said lamination, said relay means being adapted to normally hold said movable contact in contact with the center tap of said coil during normal first lower voltage input operation, said relay means being operative to cause said movable contact to connect to said one end of said coil when a second higher voltage is applied across said input leads.

Figures 1, 2:
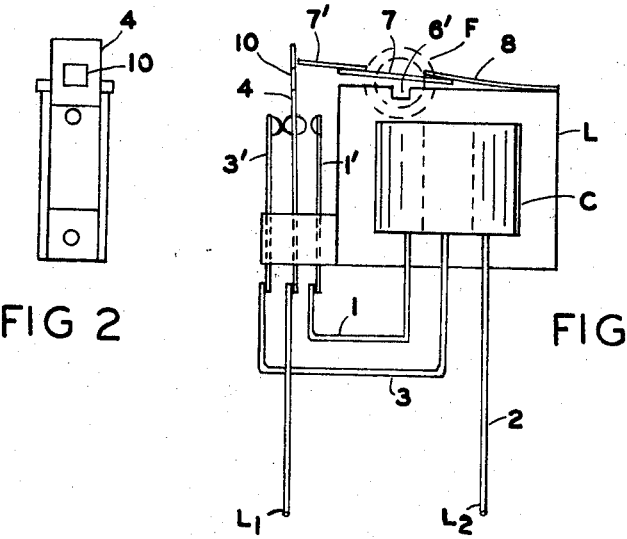
Figure 4:
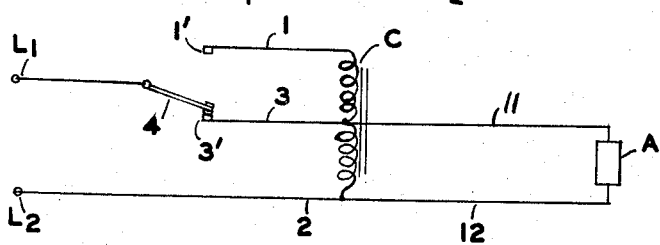

These and other objects of the invention will be apparent from the following specification and drawings of which:

FIGURE 1 is a front view of the embodiment of the invention.
FIGURE 2 is a side view of FIGURE 1.
FIGURE 3 is a top view of FIGURE 1.
FIGURE 4 is a schematic circuit diagram.

Referring to the figures, the invention generally comprises a transformer having a plurality of laminations L. The transformer may be a conventional E-I transformer core which is notched at the corner as will be explained later. The coil C is mounted in the apertures formed by the laminated core.

The coil has a common input-output lead 2 at one end, an input lead 1 at the other end, and a center tap connection 3. The apparatus thus far is conventional. The common lead is adapted to be connected to one side L2 of the input line and the input L1 is adapted to be connected either to the center tap or the other end of the coil automatically by relay means which are as follows:

The relay means consists of a first fixed contact 1' mounted on and insulated from the lamination core and connected to the input lead 1, a second fixed contact 3' is mounted on and insulated from the laminated core and connected to the center tap connection 3. The first and second fixed contacts are spaced apart from each other and a third member contact 4 is movably mounted between them, the movable contact 4 being connected to the input L1. The movable contact may have a spring finger which is normally spring loaded against the contact 1' which is connected to one end of the coil therefore, the absence of any further apparatus the input would be across the full coil.

A relay latch mechanism is provided to hold the movable contact in contact with the contact 3' connected to the center tap during the lower or 120 volt operation. The relay latch mechanism is adapted to release the movable contact when the higher voltage is connected so as to permit the movable contact to connect the high input voltage across the full coil.

The relay mechanism comprises a corner of the transformer core having a notch cut into the core at some distance from the corner so as to produce an air gap 6'. The armature member 7 is mounted by a curved spring hinge 8 on the lamination core. The armature member 7 has an extension member 7' of insulation material. The end of the extension member 7' bears against the contact 4, and just below this point of contact is a hole 10 cut in the movable member 4.

The operation of the device is as follows:

The device is normally set so that the extension member 7' bears against the upper portion of the member 4 and holds the movable contact in contact with the contact 3' so that the input voltage is connected across half of the coil. The output leads 11 and 12 of the coil are also connected across one half of the coil and connected to its other end to the appliance A which is a 120 volt appliance.

Therefore, if the input leads L1 and L2 are plugged into a 120 volt socket, then the center member contact will automatically go across one half of the coil to supply 120 volts to the appliance A. However, if the input leads are plugged into a 240 volt socket, then the additional voltage in the coil will cause a sufficient leakage flux, shown by the dotted lines F in FIGURE 1. The magnetic field attracts the armature 7 towards the gap so that the extension member 7' falls ino the hole 10 in the movable member 4.

The movable member 4 then moves via its own spring into contact with the fixed contact 1' and thereby connects the input voltage across the entire coil. Since output leads 11 and 12 are mounted across one half of the coil, the double input voltage will transform down to the rated voltage of the appliance A automatically and in a matter of milliseconds before any damage can be done to the appliance.

Once the device has been so connected to a 240 volt source, it is necessary to reset the movable contacts manually or by resetting means which are not shown but which may be incorporated in the device.

It is understood that the 120 and 240 volt figures are used for illustration only and the invention may be applied to any set of voltages.

Many modifications may be made by those who desire to practice the invention without departing from the scope thereof which is defined by the following claims.

I claim:
1. Transformer relay means comprising,
a transformer having a plurality of laminations of magnetic material,
said laminations having apertures to receive a coil,
a coil mounted within said apertures, said coil having a center tap and two ends,
a first fixed contact mounted on and insulated from said laminations and connected to one end of said coil,
a second fixed contact mounted on and insulated from said laminations and connected to the center tap of said coil,
said first and second contacts being mounted in parallel relationship but spaced a predetermined amount,
a third movable contact mounted on and insulated from said laminations and mounted between said first and second contacts,
a pair of input leads,
said movable contact being connected to one of said input leads and said second input lead being connected to the other end of said coil,
and relay means mounted on said laminations,
said relay means being adapted to normally hold said movable contact in contact with the center tap of said coil during normal first lower voltage input operation, said relay means being operative to cause said movable contact to connect to said one end of said coil when a second higher voltage is applied across said input leads.

2. Apparatus as in claim 1 wherein said relay means comprises,
a spring loaded member adapted to hold said movable contact in position making contact with the center tap of said coil and means to move said spring loaded member to cause said movable contact to make contact with said one end of said coil when a higher voltage is applied to said input leads.

3. Apparatus as in claim 2 wherein said relay means comprises,
means to attract said spring loaded member by means of leakage flux.

4. Apparatus as in claim 3 wherein said last means comprises a notch in said laminations whereby excess magnetic flux caused by said higher voltage being applied causes sufficient leakage flux to move said armature member.

References Cited

UNITED STATES PATENTS

| | | | |
|---|---|---|---|
| 960,440 | 6/1910 | Thomson | 323—43.5 |
| 2,839,718 | 6/1958 | Luftman et al. | 323—43.5 |
| 3,337,771 | 8/1967 | Weinger | 317—14 |
| 3,348,132 | 10/1967 | Moyer et al. | 323—43.5 |

MILTON O. HIRSHFIELD, *Primary Examiner.*

W. E. RAY, *Assistant Examiner.*